(12) United States Patent
Shusterman et al.

(10) Patent No.: US 9,351,329 B1
(45) Date of Patent: May 24, 2016

(54) SESSION CONTINUITY FOR PACKET DATA NETWORK GATEWAYS

(71) Applicant: Sprint Communications Company L.P., Overland Park, KS (US)

(72) Inventors: Alex Shusterman, Vienna, VA (US); Bharatwajan Raman, Arlington, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 101 days.

(21) Appl. No.: 14/463,132

(22) Filed: Aug. 19, 2014

(51) Int. Cl.
*H04W 76/02* (2009.01)
*H04W 88/16* (2009.01)

(52) U.S. Cl.
CPC ............ *H04W 76/027* (2013.01); *H04W 88/16* (2013.01)

(58) Field of Classification Search
CPC .............................. H04W 76/027; H04W 88/16
See application file for complete search history.

(56) References Cited

U.S. PATENT DOCUMENTS

| 2012/0063300 A1* | 3/2012 | Sahin | H04W 36/12 370/225 |
| 2013/0114404 A1* | 5/2013 | Yang | H04W 24/04 370/228 |
| 2014/0064183 A1 | 3/2014 | Mann et al. | |

* cited by examiner

*Primary Examiner* — Jianye Wu

(57) ABSTRACT

A Packet Data Network Gateway (P-GW) to maintain session continuity for a UE in an LTE network comprises a communication transceiver and a processing system. The communication transceiver is configured to receive a first session setup message for the UE. The processing system is configured to process the first session setup message to determine if the UE qualifies for alternate P-GW access, and if the User Equipment qualifies for the alternate P-GW access, generate a second session setup message indicating a primary P-GW ID, a primary P-GW TEID, an alternate P-GW ID, and an alternate P-GW TEID. The communication transceiver is configured to transfer the second session setup message for delivery to a Service Gateway (S-GW) in the LTE network, wherein the S-GW automatically uses the alternate P-GW ID and the alternate P-GW TEID if performance of the primary P-GW ID and the primary P-GW TEID falls below a threshold.

20 Claims, 5 Drawing Sheets

---

201 — RECEIVE AND PROCESS A FIRST SESSION SETUP MESSAGE FOR USER EQUIPMENT (UE) TO DETERMINE IF THE UE QUALIFIES FOR ALTERNATE P-GW ACCESS

202 — IF THE UE QUALIFIES FOR THE ALTERNATE P-GW ACCESS, THEN GENERATE A SECOND SESSION SETUP MESSAGE INDICATING A PRIMARY P-GW IDENTIFIER (ID), A PRIMARY P-GW TUNNEL ENDPOINT ID (TEID), AN ALTERNATE P-GW ID, AND AN ALTERNATE P-GW TEID

203 — TRANSFER THE SECOND SESSION SETUP MESSAGE FOR DELIVERY TO A SERVICE GATEWAY (S-GW) IN THE LTE NETWORK, WHEREIN THE S-GW AUTOMATICALLY USES THE ALTERNATE P-GW ID AND THE ALTERNATE P-GW TEID IF PERFORMANCE OF THE PRIMARY P-GW ID AND THE PRIMARY P-GW TEID FALLS BELOW A THRESHOLD

SESSION CONTINUITY FOR PACKET DATA NETWORK GATEWAYS

TECHNICAL BACKGROUND

A wireless communication device transmits and receives information wirelessly via a wireless access node to communicate over a communication network. Typically, the wireless access node is part of a radio access network (RAN) which provides the wireless communication device with access to further communication networks, systems, and devices. In fourth generation (4G) long term evolution (LTE) communication systems, a wireless communication device is referred to as user equipment (UE), while a wireless access node is called an enhanced node B (eNodeB).

An LTE communication network utilizes a serving gateway (S-GW) to manage UE mobility during handovers between eNodeBs and to route user data packets to a packet data network gateway (P-GW). The P-GW serves as an egress/ingress point for user data packets to and from a packet data network (PDN). The S-GW and P-GW typically communicate over an S5/S8 interface to support the control and data plane stacks.

Because the 4G LTE standard supports only packet switching in its all-IP network, the voice over long term evolution (VoLTE) protocol is typically employed to provide voice services over an LTE communication network. However, due to the real-time nature of voice calls, any delay in presenting the VoLTE voice packets is typically noticeable by the callers. Delay or jitter that occurs during other real-time data services, such as streaming media, may also be perceived by a user as unacceptable. Although such delays may be caused by any network element, poor performance or even failure of the P-GW can often be responsible.

Overview

A method of operating a Packet Data Network Gateway (P-GW) to maintain session continuity for User Equipment in a Long Term Evolution (LTE) network is disclosed. The method comprises receiving and processing a first session setup message for the User Equipment to determine if the User Equipment qualifies for alternate P-GW access, and if the User Equipment qualifies for the alternate P-GW access, then generating a second session setup message indicating a primary P-GW Identifier (ID), a primary P-GW Tunnel Endpoint ID (TEID), an alternate P-GW ID, and an alternate P-GW TEID. The method further comprises transferring the second session setup message for delivery to a Service Gateway (S-GW) in the LTE network, wherein the S-GW automatically uses the alternate P-GW ID and the alternate P-GW TEID if performance of the primary P-GW ID and the primary P-GW TEID falls below a threshold.

A Packet Data Network Gateway (P-GW) to maintain session continuity for User Equipment (UE) in a Long Term Evolution (LTE) network comprises a communication transceiver and a processing system. The communication transceiver is configured to receive a first session setup message for the UE. The processing system is configured to process the first session setup message to determine if the UE qualifies for alternate P-GW access, and if the User Equipment qualifies for the alternate P-GW access, then to generate a second session setup message indicating a primary P-GW Identifier (ID), a primary P-GW Tunnel Endpoint ID (TEID), an alternate P-GW ID, and an alternate P-GW TEID. The communication transceiver is configured to transfer the second session setup message for delivery to a Service Gateway (S-GW) in the LTE network, wherein the S-GW automatically uses the alternate P-GW ID and the alternate P-GW TEID if performance of the primary P-GW ID and the primary P-GW TEID falls below a threshold.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
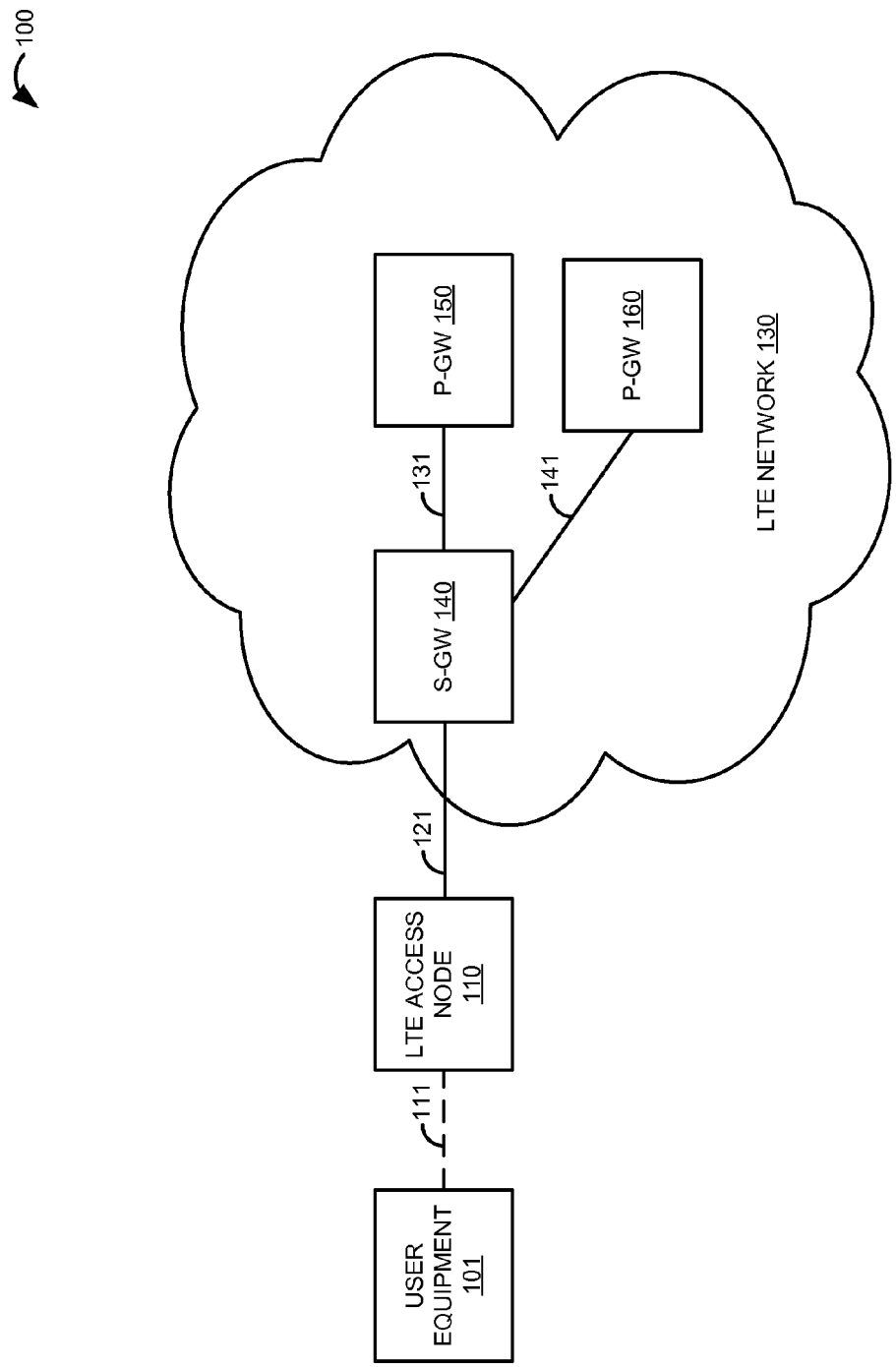
FIG. 1 is a block diagram that illustrates a communication system.

FIG. 1 is a block diagram that illustrates communication system 100. Communication system 100 includes user equipment (UE) 101, Long Term Evolution (LTE) access node 110, and LTE network 130. LTE network 130 includes Serving Gateway (S-GW) 140, Packet Data Network Gateway (P-GW) 150, and P-GW 160. UE 101 and LTE access node 110 are in communication over wireless communication link 111. LTE access node 110 and S-GW 140 communicate over communication link 121. S-GW 140 and P-GW 150 are in communication over communication link 131, while S-GW 140 and P-GW 160 communicate over communication link 141.

Figure 2:
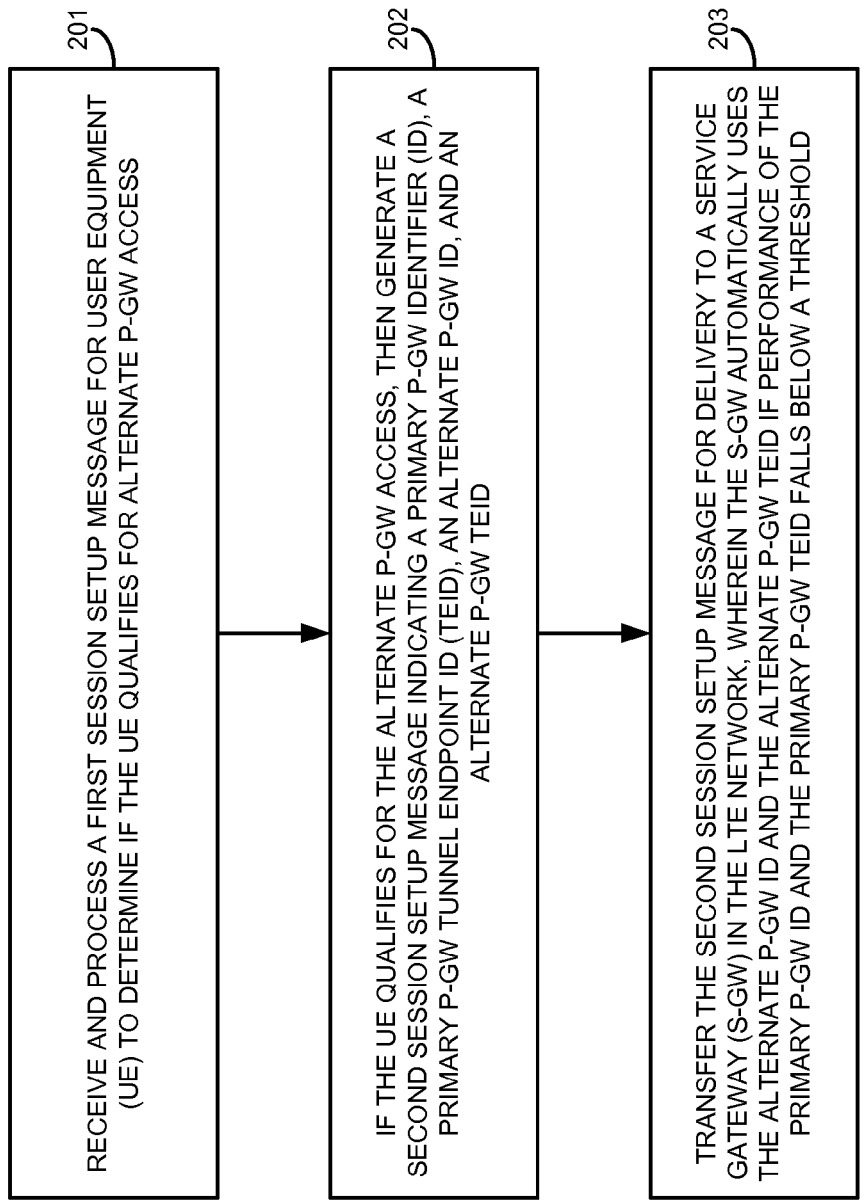
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by P-GW 150 to maintain session continuity for UE 101 in LTE network 130. For ease of discussion, the following description may refer to P-GW 150 as a primary P-GW, and P-GW 160 as an alternate P-GW.

As shown in the operational flow of FIG. 2, P-GW 150 receives and processes a first session setup message for UE 101 to determine if UE 101 qualifies for alternate P-GW 160 access (201). P-GW 150 could receive the first session setup message from any device, system, or network element, but may typically receive the first session setup message from a Policy Charging and Rules Function (PCRF) in LTE network 130 in some examples (not shown). Based on the first session setup message for UE 101, P-GW 150 could determine if UE 101 qualifies for alternate P-GW 160 access in a number of ways. For example, the first setup session message could include a flag or some other indicator that identifies UE 101 as authorized for alternate P-GW 160 access. In some examples, P-GW 150 could process the first session setup message to determine if UE 101 qualifies for the alternate P-GW 160 access by processing QoS data received from a PCRF to determine if UE 101 qualifies for the alternate P-GW 160 access. For example, the first session setup message could include a quality of service (QoS) level associated with UE 101, and P-GW 150 could determine that UE 101 qualifies for alternate P-GW 160 access if the QoS level for UE 101 meets or exceeds a predetermined QoS level. Additionally or alternatively, in some examples P-GW 150 could maintain a list of device identifiers of UEs that are qualified for alternate P-GW 160 access, and P-GW 150 could determine that UE 101 is qualified for alternate P-GW 160 access by correlating a device identifier for UE 101 included in the first session setup message with an entry in the list of UEs that are qualified for alternate P-GW 160 access. Other techniques for P-GW 150 to process the first session setup message to determine if UE 101 qualifies for alternate P-GW 160 access are possible and within the scope of this disclosure.

If UE 101 qualifies for the alternate P-GW 160 access, then P-GW 150 generates a second session setup message indicating a primary P-GW Identifier (ID), a primary P-GW Tunnel Endpoint ID (TEID), an alternate P-GW ID, and an alternate P-GW TEID (202). The primary P-GW ID and the primary P-GW TEID are associated with primary P-GW 150, while the alternate P-GW ID and the alternate P-GW TEID are associated with alternate P-GW 160. Among other purposes, the primary P-GW ID identifies P-GW 150 to S-GW 140, and the alternate P-GW ID identifies alternate P-GW 160 to S-GW 140. Typically, internet protocol (IP) tunnels are established between S-GW 140 and P-GW 150 and between S-GW 140 and P-GW 160 in order to transmit signaling information, control data, and bearer traffic between these nodes. The primary P-GW TEID identifies the endpoint of the tunnel or tunnels that terminate at primary P-GW 150, and the alternate P-GW TEID identifies the tunnel endpoint at alternate P-GW 160. In some examples, the primary P-GW TEID and the alternate P-GW TEID could comprise General Packet Radio Service (GPRS) TEIDs. For example, the GPRS tunneling protocol (GTP) stack typically assigns a unique TEID to each GTP control connection to the peers, and also assigns a unique TEID to each GTP user connection (bearer) to the peers. Additionally or alternatively, the primary P-GW TEID and the alternate P-GW TEID could comprise S5/S8 user plane and/or control plane TEIDs. Among other functionality, an LTE S5 and/or S8 interface typically provides user plane tunneling, control plane tunneling, and tunnel management between S-GW 140 and P-GW 150 and between S-GW 140 and P-GW 160.

P-GW 150 transfers the second session setup message for delivery to S-GW 140 in the LTE network 130, wherein S-GW 140 automatically uses the alternate P-GW ID and the alternate P-GW TEID if performance of the primary P-GW ID and the primary P-GW TEID falls below a threshold (203). As discussed above, the second session setup message comprises the IDs and TEIDs of the primary and alternate P-GWs 150 and 160, respectively, and S-GW 140 is therefore able to quickly identify and use the alternate P-GW ID and the alternate P-GW TEID to continue a session for UE 101 if performance of primary P-GW 150 is diminished. The threshold could comprise any value or metric in any format that S-GW 140 may compare to the performance of P-GW 150 and the tunnel associated with the primary P-GW TEID, such as data throughput, connectivity, responsiveness of P-GW 150, or any other measure of performance of P-GW 150. In some examples, where a connection between S-GW 140 and P-GW 150 is established using an S5 or S8 interface, P-GW 150 transferring the second session setup message could comprise P-GW 150 transferring an S5/S8 message for delivery to S-GW 140.

In some examples, P-GW 150 could be configured to transfer a query for alternate P-GW data and responsively receive an alternate TEID data set indicating the alternate P-GW TEID for the alternate P-GW 160. Additionally, P-GW 150 could be configured to transfer a query for Access Point Name (APN) data and responsively receive an alternate P-GW data set indicating the alternate P-GW 160 and the alternate P-GW TEID associated therewith. An APN typically identifies a packet data network (PDN) with which UE 101 may communicate, and may also define the types of services that UE 101 is authorized to access. Typically for given a UE, such as UE 101, an APN will be served by only one P-GW, such as either P-GW 150 or P-GW 160. However, in some examples, the primary P-GW ID for P-GW 150 and the alternate P-GW ID for P-GW 160 could be associated with the same APN, and the primary P-GW TEID and the alternate P-GW TEID could also be associated with the same APN. This is due to the S-GW 140 automatically using the alternate P-GW ID and the alternate P-GW TEID for session continuity if performance of primary P-GW 150 falls below a threshold, because the same APN used by primary P-GW 150 could still be used by the alternate P-GW 160 after S-GW 140 transfers a session for UE 101 in order to provide seamless session continuity.

Advantageously, primary P-GW 150 determines if UE 101 qualifies for access to alternate P-GW 160, and if so, provides the S-GW 140 with a P-GW ID and TEID for the alternate P-GW 160 in case performance of the primary P-GW 150 falls to unacceptable levels. By using the information provided by P-GW 150, S-GW 140 is able to automatically transfer a session for UE 101 to an alternate P-GW 160 in case performance of the initial P-GW 150 suffers, thereby preserving the session for UE 101 and improving the user experience for the user of UE 101.

Referring back to FIG. 1, UE 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. UE 101 may also include a user interface, memory system, software, processing circuitry, or some other communication components. For example, UE 101 could comprise a telephone, transceiver, mobile phone, cellular phone, smartphone, computer, personal digital assistant (PDA), e-book, tablet, game console, mobile Internet device, wireless network interface card, media player, or some other wireless communication apparatus—including combinations thereof. Wireless network protocols that may be utilized by UE 101 could include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between UE 101 and a wireless access node. However, although UE 101 could be capable of communicating in the above-listed and any other protocols, in the LTE-oriented example shown in communication system 100 of FIG. 1, note that UE 101 would typically utilize an LTE protocol when communicating with LTE access node 110.

LTE access node 110 comprises RF communication circuitry and an antenna. The RF communication circuitry typically includes an amplifier, filter, RF modulator, and signal processing circuitry. LTE access node 110 may also comprise a router, server, memory device, software, processing circuitry, cabling, power supply, network communication interface, structural support, or some other communication apparatus. LTE access node 110 could comprise a base station, Internet access node, telephony service node, wireless data access point, or some other wireless communication system—including combinations thereof. Some examples of LTE access node 110 include a base transceiver station (BTS), base station controller (BSC), radio base station (RBS), Node B, enhanced Node B (eNodeB), and others—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

S-GW 140 comprises a processing system and communication transceiver. S-GW 140 may also include other components such as a router, server, data storage system, and power supply. S-GW 140 may reside in a single device or may be distributed across multiple devices. S-GW 140 may be a discrete system or may be integrated within other systems—including other systems within communication system 100. In some examples, S-GW 140 could comprise a computing system, home agent, packet data serving node (PDSN), network switch, mobile switching center, router, switching system, serving general packet radio service (GPRS) support node (SGSN), access service network (ASN) gateway, serving gateway, packet gateway, network gateway system, Internet access node, application server, service node, firewall, or some other communication system—including combinations thereof.

P-GW 150 and P-GW 160 individually comprise a processing system and communication transceiver. P-GWs 150 and 160 may also include other components such as a router, server, data storage system, and power supply. P-GW 150 and P-GW 160 may individually reside in single devices or may each be distributed across multiple devices. P-GWs 150 and 160 may each be discrete systems or may be integrated within other systems—including other systems within communication system 100. In some examples, P-GWs 150 and 160 could each comprise a computing system, home agent, packet data serving node (PDSN), network switch, mobile switching center, router, switching system, serving general packet radio service (GPRS) support node (SGSN), access service network (ASN) gateway, serving gateway, packet gateway, network gateway system, Internet access node, application server, service node, firewall, or some other communication system—including combinations thereof.

Wireless communication link 111 uses the air or space as the transport medium. LTE protocols are typically utilized to transmit information over wireless communication link 111 between UE 101 and LTE access node 110, such as 3GPP LTE, LTE Advanced, or some other LTE communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121, 131, and 141 may use metal, air, space, optical fiber such as glass or plastic, or some other material as the transport medium—including combinations thereof. Communication links 121, 131, and 141 could use various communication protocols, such as TDM, IP, Ethernet, telephony, optical networking, hybrid fiber coax (HFC), communication signaling, wireless protocols, or some other communication format—including combinations thereof. Communication links 121, 131, and 141 may be direct links or could include intermediate networks, systems, or devices.

Figure 3:
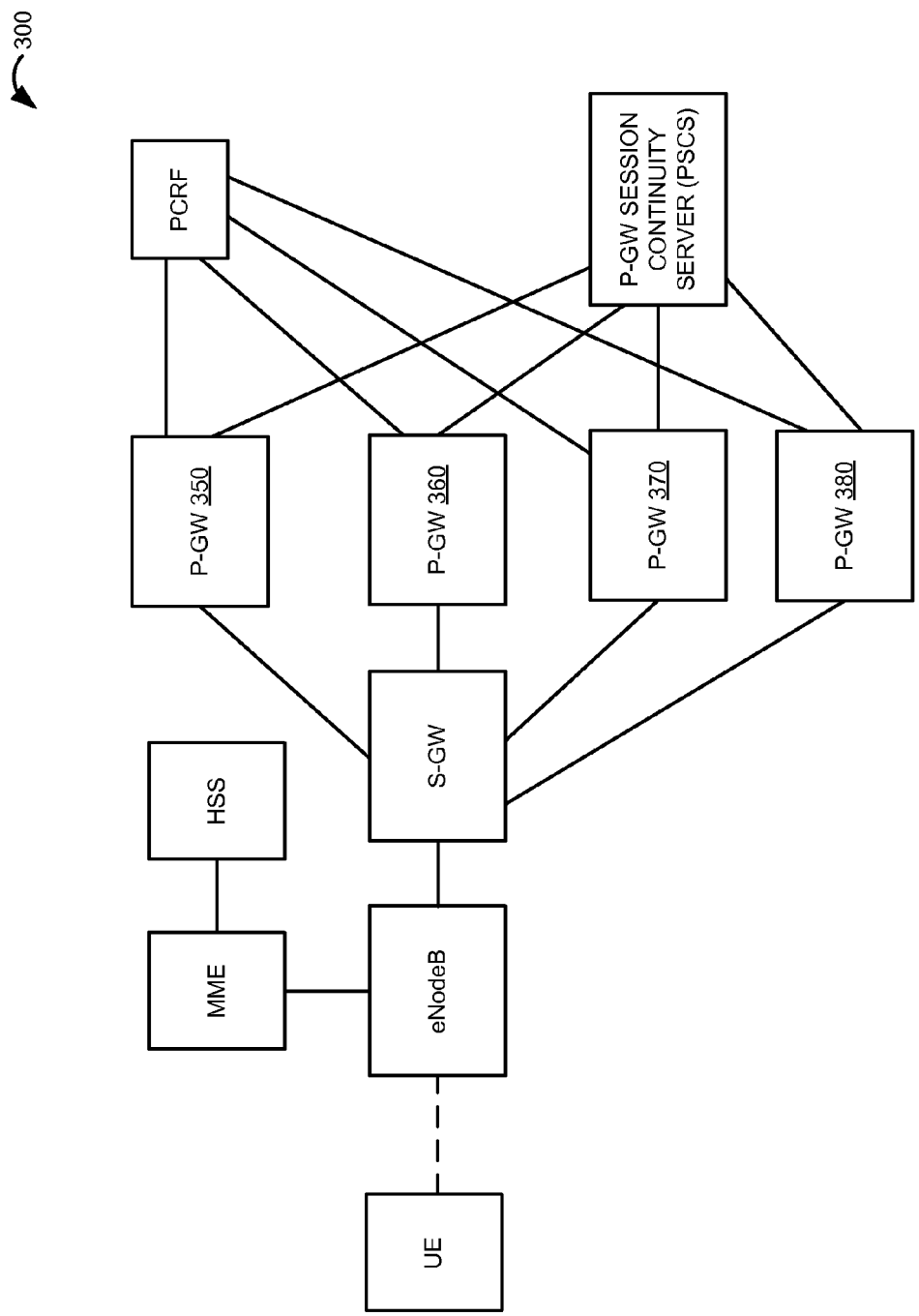
FIG. 3 is a block diagram that illustrates a communication system in an exemplary embodiment.

FIG. 3 is a block diagram that illustrates long term evolution (LTE) communication system 300 in an exemplary embodiment. LTE communication system 300 includes a user equipment (UE) device that communicates wirelessly with an enhanced Node B (eNodeB) base station that is in communication with network elements of an LTE communication network. The eNodeB base station provides an example of LTE access node 110, although node 110 may use alternative configurations. The LTE communication network in this example includes a mobility management entity (MME), home subscriber server (HSS), serving gateway (S-GW), a pool of packet data network gateways (P-GWs), a policy and charging rules function (PCRF), and a P-GW session continuity server (PSCS). The pool of P-GWs are designated P-GW 350, P-GW 360, P-GW 370, and P-GW 380 in this example. Although not shown, the LTE communication network could also include other network elements typically found in a 4G LTE communication network, such as an IP multimedia subsystem (IMS), evolved packet data gateway (ePDG), and the like.

In operation, the UE requests an internet data session via the LTE access network. The data session may provide the UE with internet access, voice over long term evolution (VoLTE) voice calling, streaming video service, or any other data service. These services are typically defined by access point names (APNs) stored in the HSS, which also identify the packet data network that provide the services. To establish a data session, the UE initiates an attach procedure in order to register with the LTE network. The attach procedure typically involves the UE utilizing a random access channel (RACH) in order to initially synchronize the UE with the eNodeB, followed by authentication, authorization, and charging functions handled in part by the PCRF. In this example, the UE belongs to an important user who is entitled to use a session continuity service, such as an emergency worker, high-ranking employee, premium subscriber, or the like.

For ease of discussion, this example assumes that P-GW 350 is initially used by the UE for packet data network access. During session establishment, the MME transfers a modify bearer command to the S-GW to instruct the S-GW to establish a bearer channel as a tunnel between the S-GW and P-GW 350. P-GW 350 receives a session setup message from the PCRF and processes the message to determine that the UE qualifies for alternate P-GW access to support the session continuity service. For example, the session setup message received by P-GW 350 from the PCRF could include a QoS level for the UE which indicates that the UE can access alternate P-GWs if the P-GW 350 that was initially selected for the UE starts to exhibit poor performance or drops out entirely. In this example, P-GW 350 determines that the UE is entitled to access alternative P-GWs for session continuity, and responsively transfers a second session setup message for delivery to the S-GW, which includes the P-GW identifier and tunnel endpoint identifier (TEID) of an alternate P-GW 360, 370, or 380.

Once the bearer between the S-GW and P-GW 350 is established, the UE initiates a data call. For example, a user may place a VoLTE call by operating the UE to initiate a data session for a VoLTE service. Responsive to the data call, the MME transfers an add bearer command to the S-GW. A bearer channel is then established as a tunnel between the UE and the S-GW in order to provide the data session to the UE for the VoLTE call. If the call quality suffers due to increased demand on P-GW 350, or if the performance of P-GW 350 drops to unacceptable levels during the VoLTE call, the S-GW will automatically use the alternate P-GW 360, 370, or 380 that was identified in the second session setup message by its P-GW identifier and TEID. In this manner, the user engaged in the VoLTE phone call remains unaware of any performance issues with the P-GW 350, since the data session for the VoLTE call is continued on the alternate P-GW by the S-GW. A detailed description of how the P-GW 350 might identify which alternate P-GW 360, 370, or 380 should be indicated by the P-GW ID and TEID in the second session setup message delivered to the S-GW will now be discussed with respect to FIG. 4.

Figure 4:
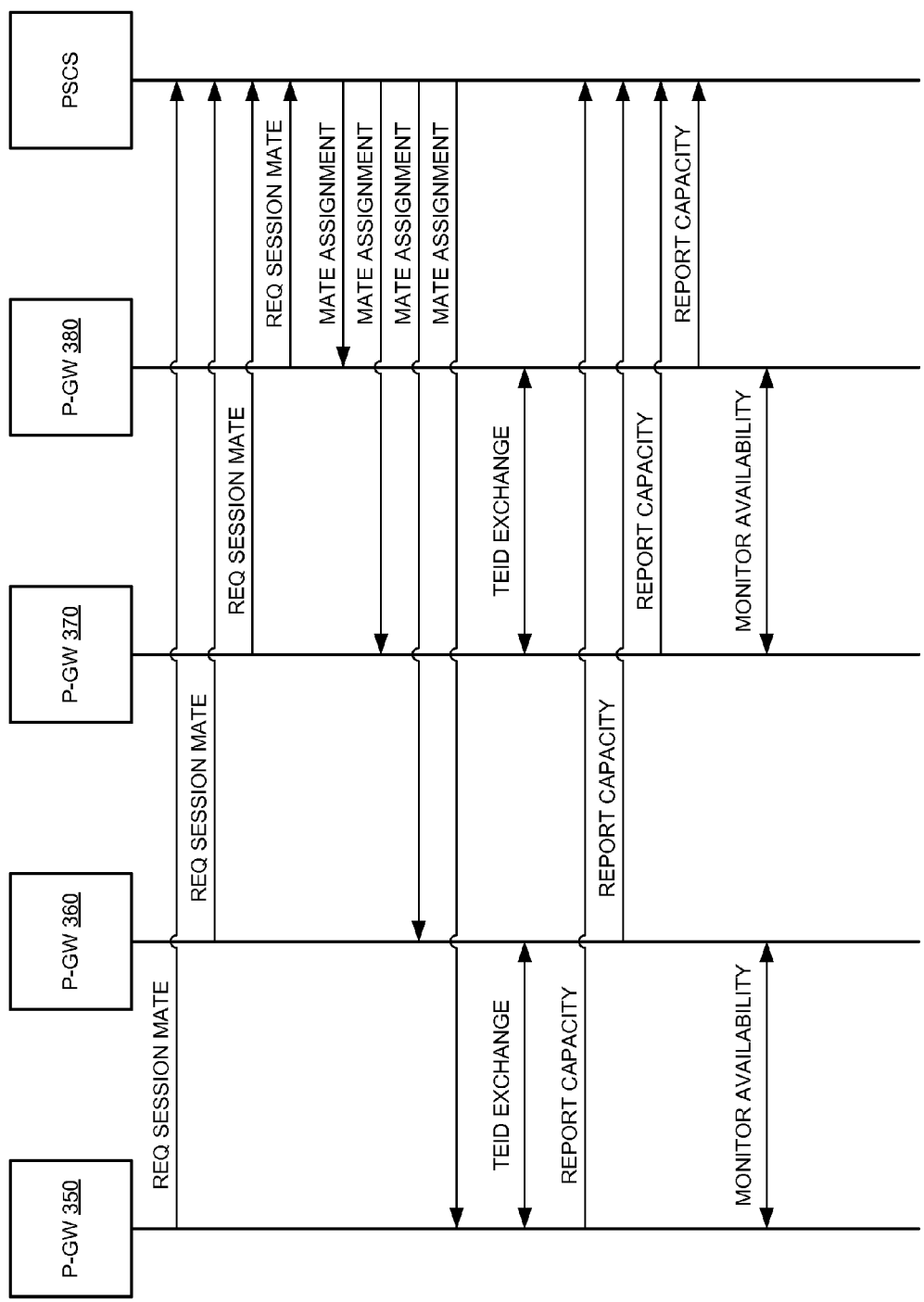
FIG. 4 is a sequence diagram that illustrates an operation of the communication system in an exemplary embodiment.

FIG. 4 is a sequence diagram that illustrates an operation of communication system 300 in an exemplary embodiment. FIG. 4 provides an example of how a P-GW session continuity server (PSCS) might be employed to manage a pool of P-GWs 350-380 in order to provide P-GW redundancy for authorized UEs. The PSCS is a new node in the LTE communication network which manages pools of P-GWs, tracks and monitors capacities of each P-GW in the pool and the overall P-GW pool capacity in order to load balance P-GW session continuity mate assignments. The PSCS also maintains and monitors connectivity with each P-GW in the pool being managed.

To support the session continuity service, two new interfaces are defined, referred to herein as Spp and Sps. Spp provides an interface between P-GWs, and is used to maintain and monitor connectivity between paired P-GWs and to exchange tunnel endpoint information for session continuity. Sps provides an interface between the PSCS and the P-GWs and may be used to maintain and monitor connectivity between a P-GW and the PSCS. The Sps interface is also used by a P-GW to request a geo-redundant P-GW assignment managed by the PSCS and to report P-GW capacity information to the PSCS.

Existing interfaces are also modified and new information elements (IEs) are added to support this session continuity service. The Create Session Request/Response messages on the S11 interface between the MME and the S-GW and the S5/S8 interface between the S-GW and the P-GWs 350-380 are modified with the addition of a new information element, the Fully Qualified Tunnel Endpoint Identifier Redundant (F-TEID-R) IE that may be used to transport the redundant P-GW tunnel information to the S-GW and/or the MME. Additionally, a new "Modify Bearer Request/Response" IE is added to the S11 and S5/S8 interfaces, which is a new F-TEID-R IE that is added to the Bearer Context Grouped IE. Further, the Gx interface between the P-GWs and the PCRF is modified to add a new "Credit Control Request/Answer" IE, which provides a new Access Node Gateway (AN-GW)-Address-Redundancy Attribute-Value Pair (AVP) to hold and propagate the redundant P-GW information assigned by the PSCS.

Initially, each P-GW 350, 360, 370, and 380 utilize the Sps interface to request assignment of a redundant mate for session continuity from the PSCS. The PSCS responds to the requests using the Sps interface to provide redundant mate assignments to the requesting P-GWs 350, 360, 370, and 380. In this example, the PSCS assigns P-GWs 350 and 360 as a pair of redundant mates, and P-GWs 370 and 380 as another pair of redundant mates.

Once the P-GW session mates are assigned, the P-GWs 350 and 360 use the Spp interface to notify each other of the mate assignment and to request tunnel endpoint reservation information from one another. Likewise, P-GWs 370 and 380 utilize the Spp interface to request and exchange their respective TEIDs for tunnel endpoint reservation in the event that session continuity is needed. The P-GWs 350-380 then continually report their capacity to the PSCS using the Sps interface in order to provide the PSCS the information needed to load balance P-GW session continuity mate assignments. Each P-GW redundant pair also monitors the connectivity and availability of its mate using the Spp interface, so in this example, P-GWs 350 and 360 monitor the availability of each other, and P-GWs 370 and 380 monitor their respective availabilities.

According to the above techniques, each P-GW will be part of a mated pair as assigned by the PSCS. The P-GW pairs will exchange their respective TEID information which can be provided to and used by the S-GW to automatically connect to the other P-GW in the event the performance of a P-GW serving a UE that is authorized for the session continuity service suffers from performance degradation. In this manner, LTE data session resiliency is improved by making failures of P-GWs transparent to the user, thereby improving performance for real-time and delay-sensitive services.

Figure 5:
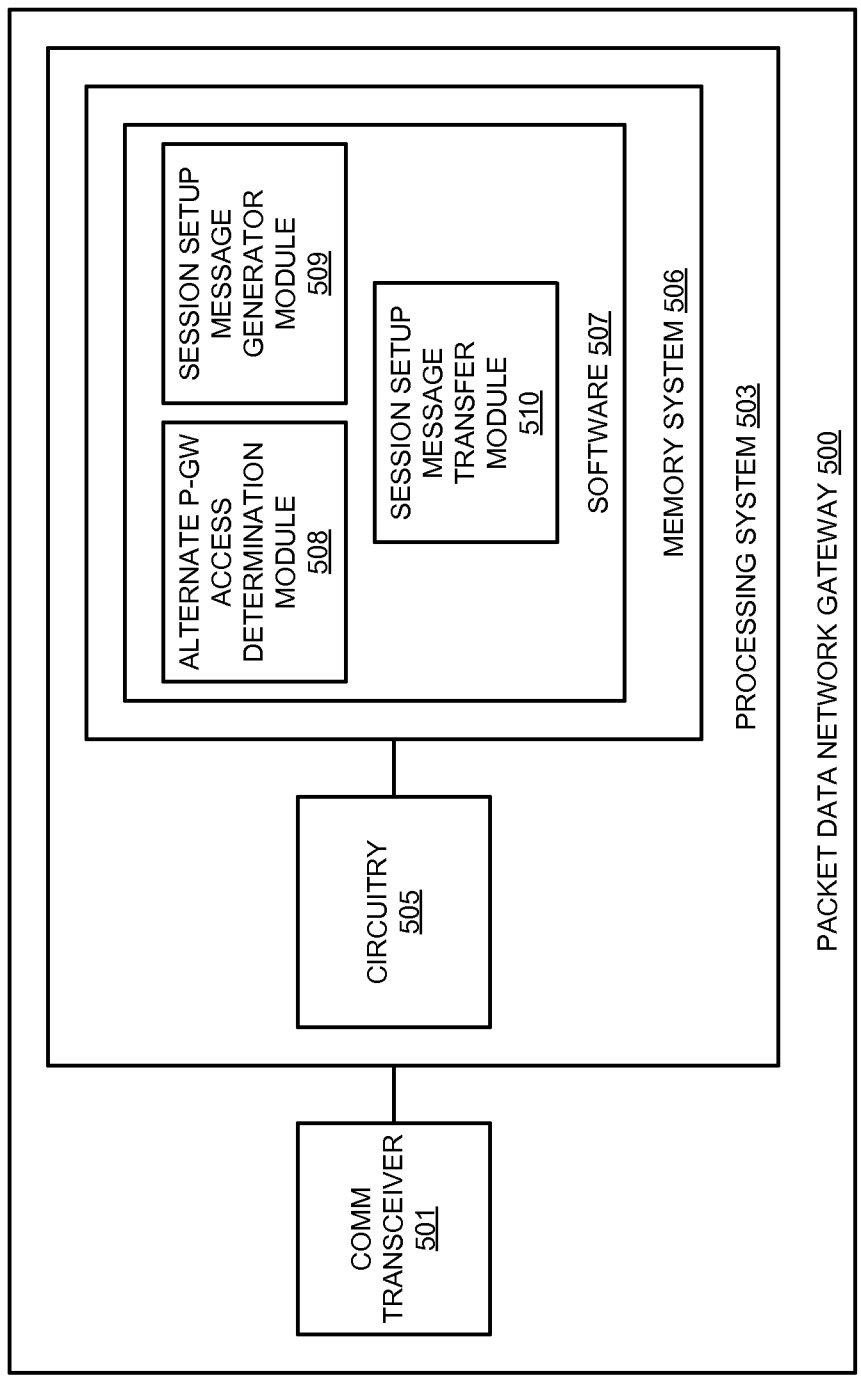
FIG. 5 is a block diagram that illustrates a packet data network gateway.

FIG. 5 is a block diagram that illustrates packet data network gateway 500. Packet data network gateway 500 provides an example of P-GW 150, although P-GW 150 may use alternative configurations. Packet data network gateway 500 comprises communication transceiver 501 and processing system 503. Processing system 503 is linked to communication transceiver 501. Processing system 503 includes processing circuitry 505 and memory device 506 that stores operating software 507. Operating software 507 comprises software modules 508-510.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use TDM, IP, Ethernet, optical networking, wireless protocols, communication signaling, or some other communication format—including combinations thereof. Communication transceiver 501 is configured to receive a first session setup message for User Equipment. Communication transceiver 501 is also configured to transfer a second session setup message indicating a primary P-GW Identifier (ID), a primary P-GW Tunnel Endpoint ID (TEID), an alternate P-GW ID, and an alternate P-GW TEID for delivery to a Service Gateway (S-GW) in an LTE network, wherein the S-GW automatically uses the alternate P-GW ID and the alternate P-GW TEID if performance of the primary P-GW ID and the primary P-GW TEID falls below a threshold.

Processing circuitry 505 comprises microprocessor and other circuitry that retrieves and executes operating software 507 from memory system 506. Processing circuitry 505 may comprise a single device or could be distributed across multiple devices—including devices in different geographic areas. Processing circuitry 505 may be embedded in various types of equipment. Memory system 506 comprises a non-transitory computer readable storage medium, such as a disk drive, flash drive, data storage circuitry, or some other hardware memory apparatus. Memory system 506 may comprise a single device or could be distributed across multiple devices—including devices in different geographic areas. Memory system 506 may be embedded in various types of equipment. In some examples, a computer apparatus could comprise memory system 506 and operating software 507. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-510, although software 507 could have alternative configurations in other examples.

When executed by circuitry 505, operating software 507 directs processing system 503 to operate as described herein for P-GW 150. In particular, operating software 507 may direct processing system 503 to direct communication transceiver 501 to receive a first session setup message for User Equipment. Operating software 507 may further direct processing system 503 to process the first session setup message to determine if the User Equipment qualifies for alternate P-GW access, and if the User Equipment qualifies for the alternate P-GW access, then to generate a second session setup message indicating a primary P-GW Identifier (ID), a primary P-GW Tunnel Endpoint ID (TEID), an alternate P-GW ID, and an alternate P-GW TEID. In addition, operating software 507 directs processing system 503 to direct communication transceiver 501 to transfer the second session setup message for delivery to a Service Gateway (S-GW) in an LTE network, wherein the S-GW automatically uses the alternate P-GW ID and the alternate P-GW TEID if performance of the primary P-GW ID and the primary P-GW TEID falls below a threshold.

In some examples, operating software 507 could comprise an alternate P-GW access determination software module 508 that receives a first session setup message for User Equipment. Additionally, operating software 507 could comprise a session setup message generator software module 509 that processes the first session setup message to determine if the User Equipment qualifies for alternate P-GW access, and if the User Equipment qualifies for the alternate P-GW access, then to generate a second session setup message indicating a primary P-GW Identifier (ID), a primary P-GW Tunnel Endpoint ID (TEID), an alternate P-GW ID, and an alternate P-GW TEID. Further, operating software 507 could comprise a session setup message transfer software module 510 that transfers the second session setup message for delivery to a Service Gateway (S-GW) in the LTE network, wherein the S-GW automatically uses the alternate P-GW ID and the alternate P-GW TEID if performance of the primary P-GW ID and the primary P-GW TEID falls below a threshold.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Packet Data Network Gateway (P-GW) to maintain session continuity for User Equipment in a Long Term Evolution (LTE) network, the method comprising:

receiving and processing a first session setup message for the User Equipment to determine if the User Equipment qualifies for alternate P-GW access;

if the User Equipment qualifies for the alternate P-GW access, then generating a second session setup message indicating a primary P-GW Identifier (ID), a primary P-GW Tunnel Endpoint ID (TEID), an alternate P-GW ID, and an alternate P-GW TEID; and transferring the second session setup message for delivery to a Service Gateway (S-GW) in the LTE network, wherein the S-GW automatically uses the alternate P-GW ID and the alternate P-GW TEID if performance of the primary P-GW ID and the primary P-GW TEID falls below a threshold.

2. The method of claim 1 wherein processing the first session setup message to determine if the User Equipment qualifies for the alternate P-GW access comprises processing Quality-of-Service (QoS) data from a Policy and Charging Rules Function (PCRF) to determine if the User Equipment qualifies for the alternate P-GW access.

3. The method of claim 1 wherein generating and transferring the second session setup message comprises transferring an S5/S8 message.

4. The method of claim 1 wherein the primary P-GW TEID and the alternate P-GW TEID comprise General Packet Radio Service TEIDs.

5. The method of claim 1 wherein the primary P-GW TEID and the alternate P-GW TEID comprise S5/S8 user plane TEIDs.

6. The method of claim 1 wherein the primary P-GW TEID and the alternate P-GW TEID comprise S5/S8 control plane TEIDs.

7. The method of claim 1 wherein the primary P-GW TEID and the alternate P-GW TEID are associated with a same Access Point Name (APN).

8. The method of claim 1 wherein the primary P-GW ID and the alternate P-GW ID are associated with a same Access Point Name (APN).

9. The method of claim 1 further comprising transferring a query for alternate P-GW data and responsively receiving an alternate TEID data set indicating the alternate P-GW TEID for the alternate P-GW.

10. The method of claim 1 further comprising transferring a query for Access Point Name (APN) data and responsively receiving an alternate P-GW data set indicating the alternate P-GW and the alternate P-GW TEID.

11. A Packet Data Network Gateway (P-GW) to maintain session continuity for User Equipment in a Long Term Evolution (LTE) network, the P-GW comprising:

a communication transceiver configured to receive a first session setup message for the User Equipment;

a processing system configured to process the first session setup message to determine if the User Equipment qualifies for alternate P-GW access, and if the User Equipment qualifies for the alternate P-GW access, then to generate a second session setup message indicating a primary P-GW Identifier (ID), a primary P-GW Tunnel Endpoint ID (TEID), an alternate P-GW ID, and an alternate P-GW TEID; and the communication transceiver configured to transfer the second session setup message for delivery to a Service Gateway (S-GW) in the LTE network, wherein the S-GW automatically uses the alternate P-GW ID and the alternate P-GW TEID if performance of the primary P-GW ID and the primary P-GW TEID falls below a threshold.

12. The P-GW of claim 11 wherein the processing system configured to process the first session setup message to determine if the User Equipment qualifies for the alternate P-GW access comprises the processing system configured to process Quality-of-Service (QoS) data from a Policy and Charging Rules Function (PCRF) to determine if the User Equipment qualifies for the alternate P-GW access.

13. The P-GW of claim 11 wherein the communication transceiver configured to transfer the second session setup message comprises the communication transceiver configured to transfer an S5/S8 message.

14. The P-GW of claim 11 wherein the primary P-GW TEID and the alternate P-GW TEID comprise General Packet Radio Service TEIDs.

15. The P-GW of claim 11 wherein the primary P-GW TEID and the alternate P-GW TEID comprise S5/S8 user plane TEIDs.

16. The P-GW of claim 11 wherein the primary P-GW TEID and the alternate P-GW TEID comprise S5/S8 control plane TEIDs.

17. The P-GW of claim 11 wherein the primary P-GW TEID and the alternate P-GW TEID are associated with a same Access Point Name (APN).

18. The P-GW of claim 11 wherein the primary P-GW ID and the alternate P-GW ID are associated with a same Access Point Name (APN).

19. The P-GW of claim 11 wherein the processing system is configured to generate a query for alternate P-GW data and process a response having an alternate TEID data set indicating the alternate P-GW TEID for the alternate P-GW and wherein the communication transceiver is configured to transfer the query and receive the response.

20. The P-GW of claim 11 wherein the processing system is configured to generate a query for Access Point Name (APN) data and process a response having an alternate P-GW data set indicating the alternate P-GW TEID for the alternate P-GW and wherein the communication transceiver is configured to transfer the query and receive the response.

* * * * *